(12) United States Patent
Belleville et al.

(10) Patent No.: US 11,084,755 B2
(45) Date of Patent: Aug. 10, 2021

(54) METHOD FOR IMPROVING THE RESISTANCE TO LASER FLUX OF AN OPTICAL COMPONENT

(71) Applicant: COMMISSARIAT À L'ÉNERGIE ATOMIQUE ET AUX ÉNERGIES ALTERNATIVES, Paris (FR)

(72) Inventors: Philippe Belleville, Tours (FR); Sébastien Lambert, Saint-Epain (FR); Mathilde Pfiffer, Saint-Medrad-En-Jalles (FR); Philippe Cormont, Le Bouscat (FR)

(73) Assignee: COMMISSARIAT À L'ÉNERGIE ATOMIQUE ET AUX ÉNERGIES ALTERNATIVES, Paris (FR)

( * ) Notice: Subject to any disclaimer, the term of this patent is extended or adjusted under 35 U.S.C. 154(b) by 0 days.

(21) Appl. No.: 16/335,346

(22) PCT Filed: Sep. 22, 2017

(86) PCT No.: PCT/FR2017/052551
§ 371 (c)(1),
(2) Date: Mar. 21, 2019

(87) PCT Pub. No.: WO2018/055303
PCT Pub. Date: Mar. 29, 2018

(65) Prior Publication Data
US 2019/0233326 A1    Aug. 1, 2019

(30) Foreign Application Priority Data
Sep. 23, 2016    (FR) .................................. 16 58944

(51) Int. Cl.
*C03C 15/02* (2006.01)
*C09K 13/02* (2006.01)

(52) U.S. Cl.
CPC .............. *C03C 15/02* (2013.01); *C09K 13/02* (2013.01)

(58) Field of Classification Search
CPC ....................................................... C03C 15/02
See application file for complete search history.

(56) References Cited

U.S. PATENT DOCUMENTS 4,816,049 A  *  3/1989  Hata ...................... C03C 15/02
                                                              427/163.2
6,099,389 A       8/2000  Nichols et al.
(Continued)

FOREIGN PATENT DOCUMENTS

EP        0693186 B1    6/1997
JP        2001-342041 A   12/2001
(Continued)

OTHER PUBLICATIONS

International Search Report for International Application No. PCT/FR2017/052551, dated Nov. 8, 2017.
(Continued)

*Primary Examiner* — Roberts P Culbert
(74) *Attorney, Agent, or Firm* — Pearne & Gordon LLP

(57) ABSTRACT

A method for improving the properties of resistance to laser flux of an optical component, comprising a step consisting in bringing the component into contact with an aqueous solution comprising at least one hydroxide of an alkaline metal or an alkaline earth metal in a quantity of between 5 and 30 mass % and having a temperature T of between 50 and 100° C.

11 Claims, 4 Drawing Sheets

(56) References Cited

U.S. PATENT DOCUMENTS

| | | |
|---|---|---|
| 2011/0079931 A1 | 4/2011 | Miller et al. |
| 2016/0207828 A1* | 7/2016 | Kashima ............ C03C 23/0075 |
| 2018/0009669 A1 | 1/2018 | Allemand et al. |
| 2019/0006579 A1 | 1/2019 | Boy et al. |

FOREIGN PATENT DOCUMENTS

| | | |
|---|---|---|
| JP | 2002-286902 A | 10/2002 |
| WO | 98/07053 A2 | 2/1998 |
| WO | 2013/071021 A2 | 5/2013 |
| WO | 2014/195472 A1 | 12/2014 |
| WO | 2015/052556 A1 | 4/2015 |

OTHER PUBLICATIONS

Written Opinion for International Application No. PCT/FR2017/052551, dated Nov. 8, 2017.

Preliminary French Search Report for Application No. 1658944, dated Mar. 30, 2017.

Tayyab I Suratwala et al. "HF-Based etching processes for improving laser damage resistance of fused silica optical surfaces", Journal of the American Ceramic Society, vol. 94, No. 2, 2011, pp. 416-428.

Ringlien et al, "An acid treatment for raising the surface damage threshold of laser glass", Applied Physics Letters, vol. 25, No. 10, 1974, pp. 598-600.

Battersby et al, "Effects of Wet Etch Processing on Laser-Induced Damage of Fused Silica Surfaces", Proc. SPIE. 3578, Laser-Induced Damage in Optical Materials, 1998.

Xu et al, "The Effect of Deep HF Etching on the Surface Quality and Figure of Fused Silica Optics", Proc. of SPIE vol. 9575, Optical Manufacturing and Testing XI, 95750P, 2015.

Khan et al, "Etching of Glass Solid State Nuclear Track Detectors in Aqueous Solutions of $(NH_4)HF_2$, NaOH and KOH", International Journal of Applied Radiation and Isotopes, vol. 29, 1978, pp. 229-232.

Sakai et al, "Chemical etching using KOH aqueous solution for corona-charge micropatteming of soda-lime glass". Japanese Journal of Applied Physics, vol. 52, 2013, pp. 036701.1-036704.4.

Kiyama et al, Examination of etching agent and etching mechanism on femtosecond laser microfabrication of channels inside vitreous silica substrates, J. Phys. Chem. C, vol. 113, No. 27, 2009, pp. 11560-11566.

Jensen et al, "Higher certainty of the laser induced damage threshold test with a redistributing data treatment", Review of Scientific Instruments, vol. 86, 103106, 2015.

International Preliminary Report of Patentability for PCT/FR2017/052551, dated Sep. 19, 2018.

* cited by examiner

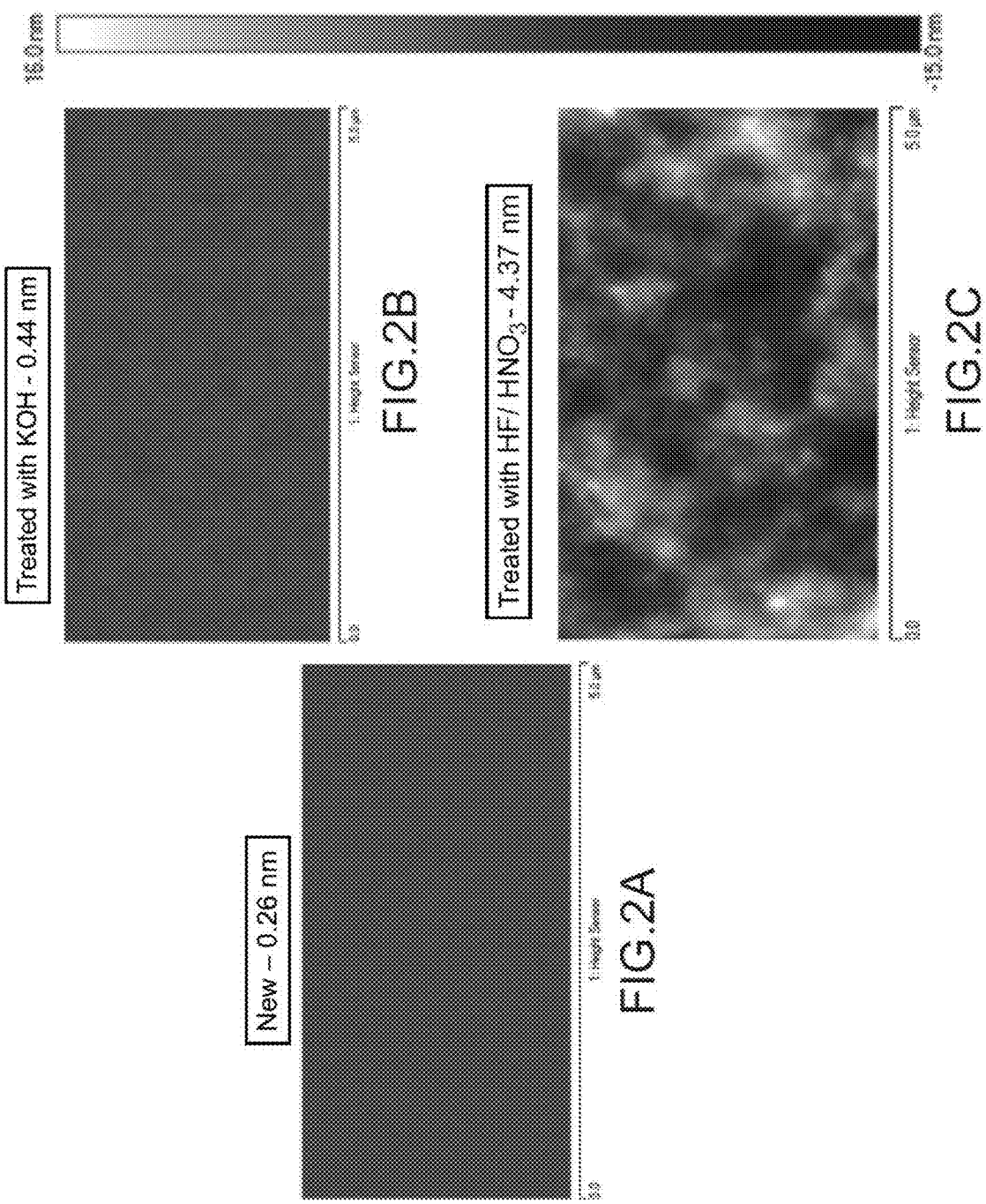

METHOD FOR IMPROVING THE RESISTANCE TO LASER FLUX OF AN OPTICAL COMPONENT

CROSS-REFERENCE TO RELATED APPLICATIONS

This is a National Stage application of PCT international application PCT/FR2017/052551, filed on Sep. 22, 2017, which claims the priority of French Patent Application No. 16 58944, filed Sep. 23, 2016, both of which are incorporated herein by reference in their entireties.

TECHNICAL FIELD

The present invention relates to the general field of optical components, and in particular to the field concerning the manufacture and treatment of optical components for laser lines.

More particularly, the present invention proposes a treatment method allowing an optical component to be obtained having improved resistance to laser flux compared with the laser flux resistance of an optical component of same type and shape that is non-treated. This method consists in treating the optical component with a particular alkaline corrosive solution.

STATE OF THE PRIOR ART

The difficulty for laser lines when manufacturing optical components lies in the need first to provide a perfect shape so as not to deform the laser wave front, and secondly excellent flux resistance to prevent damage to the optical component under high laser power in particular in the ultraviolet.

To reach high flux resistance performance, new manufacturing methods of the material have been required such as those described in international applications WO 2013/071021 [1] and WO 98/07053 [2] which have allowed increased resistance of fused silica, the material chiefly used on power laser lines. More particularly, in the method described in international application WO 2013/071021 [1] the glass to be treated is placed in contact with an aqueous acid solution practically fluorine-free and having a pH of 3 or lower. International application WO 98/07053 [2] proposes a method to make the optical elements resistant to compacting caused by extended exposure to a UV laser beam. This method consists in subjecting the optical elements to pre-compacting e.g. irradiation with a laser beam of strong fluence, before any use thereof.

New surfacing and polishing methods have also been developed for the chief purpose of reducing sub-surface fractures at each manufacturing step [3] and to remove contaminants from the surface of optics [4]. Both these elements found with conventional manufacturing of optical components have been identified as precursors of laser damage.

Chemical attack by acid was identified many years ago as being an efficient method for removing surface contaminants and thereby improving resistance of optics to laser flux [5,6]. This technique has since been improved through numerous patents [3,7]. For example, patent U.S. Pat. No. 6,099,389 [3] proposes a method whereby the surface is first abraded to remove a first layer of sub-surface damage before being subjected to acid chemical attack and then re-polished. The objective of chemical attack after polishing is then solely to remove contaminants and optionally the thin polished layer containing these contaminants as explained in patent application JP 2002/286902 [7]. This layer has a thickness of less than 1 µm; this is why, at the time of chemical attack, there is only slight removal of silica, approximately 2 µm [3], preventing deterioration of the perfect shape of the optical surface.

In 2010, Suratwala et al [8] showed that deeper chemical attack i.e. deeper than 20 µm allowed a stronger improvement in the flux resistance of optics in silica if performed under certain conditions. In this publication, chemical attack is conducted using corrosive baths containing hydrofluoric acid (HF). This method to improve the flux resistance of optics in silica was the subject of patent application US 2011/079931 [9] extending chemical attack to aqueous solutions comprising a mineral acid such as nitric acid ($HNO_3$), hydrochloric acid (HCl), perchloric acid ($HClO_4$), sulfuric acid ($H_2SO_4$) and phosphoric acid ($H_3PO_4$). The conditions of chemical attack examined by Suratwala et al [8] such as temperature, concentration of the solution, agitation in ultrasound baths and rinse time are determinant to avoid leaving any residues of chemical reaction on the surface, such residues deteriorating flux resistance. This deep chemical attack allows an improvement in the flux resistance of optics since it removes fractures of thin scratches left by polishing. However, this solution has a first disadvantage related to increased surface roughness [10]. In addition, from an industrial viewpoint, this solution is costly to implement on account of the provisions to be made to prevent risks associated with the use of hydrofluoric acid.

Since hydrofluoric acid carries serious health risks, alternative solutions for glass erosion were also examined many years ago. For example, Khan et al, 1978 [11] examined and compared attack solutions for solid nuclear detectors. These solutions comprise either ammonium difluoride (($NH_4$)$HF_2$), or sodium hydroxide (NaOH) or potassium hydroxide (KOH), these being used in the form of boiling aqueous solutions having a mass concentration of 30%, 50%, 60% or 75% NaOH or KOH. It is to be noted that when a boiling solution comprising NaOH or KOH is used at a concentration of 30 mass %, the minimum contact time with the glass is 325 min and 475 min respectively (FIG. 3 of [11]).

To obtain laser-resistant components in silica, the chemical attack employed essentially uses acid, whereas in the field of micro-electronics attack using alkaline solutions appears to be more advantageous than using acid.

Chemical attack on glass is widely used for surface texturing, in particular in the field of microelectronics. This texturing is performed using selective attack properties as a function of the properties of the glass, such properties being modified locally via pre-treatment which can be performed in multiple manners e.g. corona-charge treatment [12].

Since KOH carries fewer health risks than HF, it is researched as replacement of the latter in some applications such as the forming of microchannels in glass [13]. In this case, Kiyama et al noted that one advantage of KOH is also a higher material removal rate and better selectivity than with HF on glass pre-treated with femtosecond laser. However, these applications using KOH for the chemical attack of glass do not concern resistance to laser flux and the removals obtained are less deep than in the method described in [8].

Finally, the solution proposed in international application WO 2015/052556 [14] uses KOH on optical components for power lasers, but this method is in fact close to the method described in [8]. The KOH is only used for prior cleaning, the chemical attack which will improve flux resistance is composed of an acidic mixture of $HF/HNO_3$. It does not therefore solve the disadvantages mentioned previously in respect of the method described in [8].

The inventors therefore set themselves the objective of proposing a method for improving the laser flux resistance of optical components and particularly glass, that is easy to implement, of low cost and carries few health risks for operators.

DESCRIPTION OF THE INVENTION

The inventors have reached their set objective and propose a method for the corrosive treatment of optical components allowing improved laser resistance thereof, said method not having the shortcomings and disadvantages of prior art methods.

The inventors have shown that the use of an alkaline corrosive solution placed in contact with glass allows improved laser flux resistance of the latter, whilst controlling the removal of material from a depth of less than one micron to a depth of several microns, to maintain the functionalities of the glass and in particular its transparency. This is a novel application or use of an alkaline corrosive solution. No mention is made in the prior art of the use of said corrosive solution to treat optics for improved laser resistance thereof.

The alkaline corrosive treatment such as described by the present invention most advantageously remedies the numerous shortcomings of the acid corrosive treatments used up until now, not only to improve the laser resistance of optics but also to decontaminate optics or remove a surface treatment therefrom.

It has been evidenced that, unlike acid corrosive treatment, the alkaline corrosive treatment such as described in the present invention allows a thickness of a few nanometres to several microns to be eroded from the surface of an optical component, whilst maintaining the functional properties thereof including transparency (no optical scattering effect) and allowing the laser flux resistance of this optical component to be significantly improved. In addition, the alkaline corrosive treatment such as described in the present invention allows an improvement in the wettability of optical components and in particular of silicate optical components, making them suitable under the best conditions for application of a surface post-treatment such as stripping, layer deposit, paint deposit, varnishing, gluing or printing. The alkaline corrosive treatment such as described in the present invention also allows surface roughness to be maintained or even improved.

The results of this alkaline treatment given below have never been previously described and are neither obvious, nor predictable nor at all expected by one skilled in the art. In other words, the mere substitution of the corrosive agent, namely an acid substituted by a base, did not allow the anticipation of all these results even by one skilled in the art. The alkaline corrosive treatment such as described in the present invention provides numerous positive effects and advantages, the expectation or prediction of which could not be envisaged.

The present invention therefore concerns a method for improving the laser flux resistance properties of an optical component, comprising a step consisting in bringing said component in contact with an aqueous solution comprising at least one hydroxide of an alkaline metal or alkaline-earth metal in an amount of between 5 and 30 mass % and having a temperature T of between 50 et 100° C.

The laser flux resistance of an optical component can be defined as the resistance threshold of the optical component to a certain energy density of the laser. High laser flux resistance of an optical component therefore denotes the propensity thereof not to undergo irreversible effects of greater or lesser extent when the energy density of the laser is increased to high energy values. Irreversible effects are for example the onset of damage such as cracking, breaking, splitting or craters, in the volume or on the surface of the optical component, which gradually degrade the characteristics of the beam. Surface damage can exist both on the front and back surface in relation to the direction of propagation of the laser beam. These volume or surface modifications of the optical component are defined as laser damage.

By «improve laser flux resistance properties» it is meant that the optical component, further to the method of the invention i.e. the optical component subjected to treatment with an aqueous solution comprising at least one hydroxide of an alkaline metal or alkaline-earth metal in an amount of between 5 and 30 mass % and having a temperature of between 50 and 100° C., further to exposure to laser flux, has better laser resistance compared with an optical component of same type (same composition, same shape and same optional pre-treatments) that is non-treated and exposed to an identical laser flux. This improvement can be evidenced or quantified using techniques well known to the one skilled in the art.

The laser flux resistance of a sample is generally determined by delivering laser onto this sample and noting the variation in certain optical parameters such as scattering or absorption, or by directly observing the onset of microscopic volume or surface damage of the sample. These measurements or observations allow the determining of any damage, and assessment of the behaviour of the optical component subject to a laser flux of determined surface power. Several laser irradiation modes can be used. Standard NF EN ISO 11254 defines two of these modes which are the most often applied. According to a first mode, the power is gradually increased between two irradiations on one same point until the onset of damage. This mode has the advantage of limiting the number of points needed to obtain good statistics. However, it generates a conditioning phenomenon, the origin of which is ill-known and tends to increase flux resistance. According to a second mode, a single pulse is directed per point at a given power and the number of damage sites is determined. This allows overcoming of the conditioning phenomenon but requires a greater number of measurement points. The exact fluence of each measurement point is recorded and the set of pulses is classified in increasing order of fluence. This set of pulses is divided into sub-sets each comprising the same number of pulses. The probability of damage is calculated for each sub-set using the data processing procedure reported by Jensen et al, 2015 [15] to reduce statistical errors by fictitiously increasing the amount of data. This procedure is based on two assumptions: (1) a non-damaged site would also have resisted to irradiation with lower fluence and (2) a damaged site would also have been damaged under irradiation at higher fluence. The probability obtained for each sub-set is associated with the mean of the fluences for the pulses forming this sub-set. Applying said method to a laser having a wavelength of 355 nm, pulse of 3 ns and fluence (surface density of energy) of between 19 and 22 $J/cm^2$, the damage probability on the backside in relation to the direction of propagation of the laser beam of an optical component treated with the method subject of the invention is reduced by at least 10%, by at least 20%, by at least 30%, by at least 40% and by at least 50% compared with damage probability on the backside in relation to the direction of propagation of the laser beam of a non-treated optical component.

The present invention applies to any optical component intended to be exposed to a laser flux. Said optical component is notably selected from the group consisting of laser glass, polarizers, mirrors, lenses, diffractive optics such as phase gratings and waveplates, and view ports.

Typically, the material of the optical component treated with the method of the invention is a glassy material such as glass and in particular silica-based glass such as silicate glass, borosilicate glass, aluminosilicate glass, boro-aluminosilicate glass, fused silica or phosphate glass. Advantageously, the material of the optical component treated with the method of the invention is not soda-lime glass. More advantageously, the material of the optical component treated with the method of the invention is fused silica.

The optical component it is desired to treat in accordance with the method of the invention can be of any size and shape. In particular, this optical component can be a fused silica optic in particular such as those used in large installations using high-power lasers.

Prior to implementing the method of the present invention, the optical component has not been subjected to any treatment of physical etching type and in particular physical etching by laser e.g. femtosecond laser, or treatment of corona-charge type. On the other hand, the optical component which may be treated with the method of the present invention, before implementation of this method, may have previously been subjected to treatment of polishing type, abrasion type or surface coat deposit type such as a surface coating having an anti-reflective function.

The method of the invention uses a particular alkaline corrosive solution. The latter is composed of an aqueous solution comprising at least one hydroxide of an alkaline metal or alkaline-earth metal in an amount of between 5 and 30 mass % and having a temperature of between 50 and 100° C.

The expressions «alkaline metal» and «alkaline-earth metal» are used in their usual acceptance, namely that of the periodic table of elements. Advantageously, in the present invention, an alkaline metal is selected from the group consisting of sodium (Na), potassium (K), lithium (Li) and caesium (Cs). One alkaline-earth metal advantageously used in the present invention is calcium (Ca).

Therefore, the aqueous solution comprising at least one hydroxide of an alkaline metal or alkaline-earth metal is particularly selected from among an aqueous solution of sodium hydroxide (NaOH), an aqueous solution of potassium hydroxide (KOH), an aqueous solution of calcium hydroxide ($Ca(OH)_2$), an aqueous solution of lithium hydroxide (LiOH), an aqueous solution of caesium hydroxide (CsOH) and mixtures thereof.

In the alkaline corrosive solution used in the present invention, the hydroxide of an alkaline metal or alkaline-earth metal is contained in an amount of between 5 and 30 mass %. When the alkaline corrosive solution comprises at least two hydroxides of different alkaline metals, at least two hydroxides of different alkaline-earth metals or at least one hydroxide of an alkaline metal and at least one hydroxide of an alkaline-earth metal, the total amount of these hydroxides in this alkaline corrosive solution is between 5 and 30 mass %.

More particularly, the method of the present invention comprises the following successive steps:

a) preparing an aqueous solution comprising at least one hydroxide of an alkaline metal or alkaline-earth metal in an amount of between 5 and 30 mass % and having a temperature T of between 50 and 100° C.; and b) contacting the optical component with the solution prepared at step (a), said contacting being conducted at said temperature T.

Different manners are known to the one skilled in the art for preparing an aqueous solution comprising at least one hydroxide of an alkaline metal or of an alkaline-earth metal such as previously defined, either by diluting or mixing existing commercial compositions, or by preparing these extemporaneously. This latter alternative particularly concerns dissolving at least one hydroxide of an alkaline metal or alkaline-earth metal in water which can either be deionized water, distilled water or ultrapure water (18.2 MΩ). Typically, the dissolution of the hydroxide of an alkaline metal or alkaline-earth metal is performed in distilled water or ultrapure water (18.2 MΩ). This dissolution can be aided by heating and/or agitating the solution. If agitation is used it can be mechanical agitation, magnetic agitation or ultrasound agitation. For this purpose, a mixer, agitator, magnetic bar, ultrasound bath or homogenizer can be used with a view to obtaining a homogenous solution.

The solution thus prepared is brought to a temperature T chosen to be between 50° C. and 100° C., to within ±2° C. This temperature T called «treatment temperature» is assumed to be reached when measurement of the temperature of the alkaline corrosive solution performed using suitable metrology e.g. a thermometer, leads to a value close to the desired temperature for 15 min, to within measurement uncertainties.

In the method of the invention, the contacting between the optical component and the alkaline corrosive solution can be carried out using any means allowing uniform treatment of the surface(s) of the optical component to be treated with the corrosive solution such as previously defined.

This contacting is typically conducted by immersing and holding the optical component in the alkaline corrosive solution, and in particular by immersing vertically and holding the optical component vertically in the alkaline corrosive solution. For this purpose, it is judicious to use a holder element allowing the optical component to be handled without risk of damage or contamination. This holder element can be in the form of a strap in material that is chemically inert against the alkaline corrosive solution e.g. in Teflon®.

As a variant, and in particular when only one side of the optical component is to be subjected to treatment according to the present invention, it is possible to deposit a certain volume of alkaline corrosive solution on the side of the component to be treated or to use a diffusing intermediary i.e. a solid porous support chemically inert against the alkaline corrosive solution as described in international application WO 2014/195472 [16].

In the method of the invention, the contacting between the optical component and the alkaline corrosive solution is performed under agitation. In other words, at the time of contact, the alkaline corrosive solution is subjected to agitation. This may be mechanical agitation, magnetic agitation or ultrasound agitation. For this purpose, a mixer, agitator, magnetic bar, ultrasound bath or homogenizer can be used with a view to maintaining the homogeneity of the alkaline corrosive solution and preventing the deposit or maintaining of products resulting from corrosion on the surface of the optical component.

The duration of the contact between the optical component and the alkaline corrosive solution is less than 24 h, in particular less than 22 h, and particularly less than 20 h.

Advantageously, this contacting lasts a time of between 10 min and 18 h, and in particular between 20 min and 16 h.

In the method of the invention and more particularly at the contacting step, it is necessary to complete the volume of solution permanently with ultrapure or demineralized water, to offset evaporation induced by the temperature of the solution higher than 50° C. Any device allowing a constant concentration of the corrosive solution to be maintained via vapour condensing in particular (reflux assembly) can advantageously be used.

In addition, in the method of the invention and more particularly at the contacting step, it is necessary to maintain the temperature of the alkaline corrosive solution at the treatment temperature such as previously defined. To do so, contacting is conducted in the presence of a heating element and temperature regulating means able to maintain said heating element at a set temperature, chosen so that when said set temperature is obtained and maintained, the temperature of the alkaline corrosive solution is held at the treatment temperature.

On completion of the method of the invention i.e. at the end of the contact time between the optical component and the alkaline corrosive solution, the optical component is subjected to rinsing to remove all traces of alkaline corrosive solution. This rinsing is typically conducted with deionized water, distilled water or ultrapure water (18.2 MΩ), and more particularly with distilled water or ultrapure water (18.2 MΩ). Once rinsed, the optical component is left to dry in a clean environment to prevent any solid or liquid contamination on the surface of the treated optical component.

Other characteristics and advantages of the present invention will become further apparent to the one skilled in the art on reading the examples below, given as nonlimiting illustrations, with reference to the single appended Figure.

BRIEF DESCRIPTION OF THE DRAWINGS

FIG. 2 illustrates the surface topography and corresponding roughness values obtained with the samples before («New»; FIG. 2A) and after chemical treatment either with a basic KOH solution («KOH treated»; FIG. 2B), or with an acidic solution of $HF/HNO_3$ («Treated with $HF/HNO_3$»; FIG. 2C).

DETAILED DESCRIPTION OF PARTICULAR EMBODIMENTS

Figure 1A:
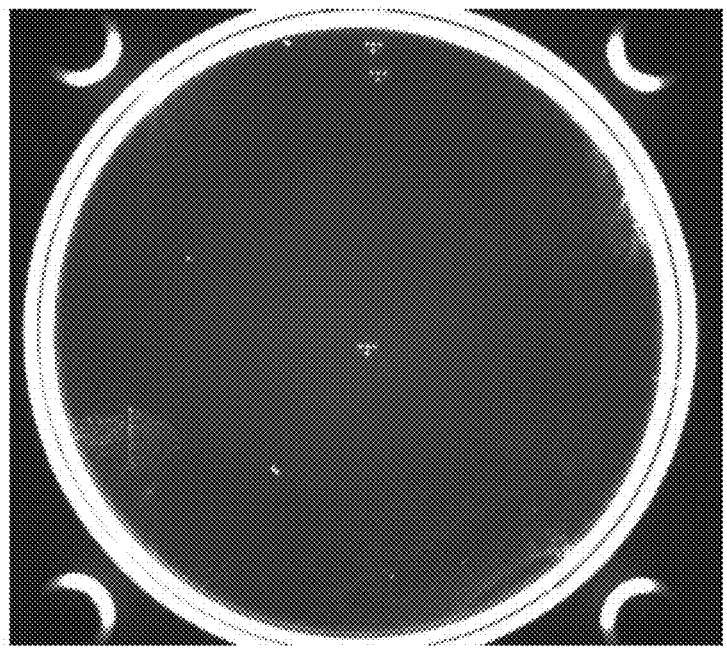
FIG. 1 illustrates characterization with the DMS system of samples either before (FIG. 1A) and after chemical treatment with an acidic solution of $HF/HNO_3$ (FIG. 1B), or before (FIG. 1C) and after chemical treatment with a basic KOH solution (FIG. 1D).

I. Preparation of the Corrosive Solution.

To prepare a corrosive potassium hydroxide solution (KOH) with a concentration of 30 mass %, 150 g of KOH pellets (AnalaR NORMAPUR 26688.296 or equivalent) are dissolved under heat with 350 ml of ultrapure or distilled water in a beaker of 500 ml capacity. To promote this operation, and improve the homogeneity of the solution, manual or magnetic stirring is used in addition to heating of the solution. The solution is ready for use when all the pellets have been dissolved. This volume of solution is specially adapted for the tests described below on optical components of circular shape and diameter of 50 mm.

The solution thus prepared is brought to the desired treatment temperature. In the examples below this temperature is 100° C. The solution is therefore termed a «corrosive treatment solution» in the remainder hereof. The temperature of this solution must be maintained at the desired temperature throughout the following operations.

II. Treatment of the Optical Ccomponent.

The optical component to be treated is inserted in an adapted holder system, allowing handling without any risk of contamination (strap). The use of a device in Teflon© is recommended, taking care that the optical component is handled the least possible. The whole is called a «strapped component» below.

The strapped component is immersed vertically in the corrosive treatment solution. This step can lead to a variation in temperature of the corrosive treatment solution. It is then necessary to adapt the set temperature of the heating means. The strapped component is held in position throughout the treatment time, under agitation.

For example, to erode 1 μm of silica, the strapped component remains in place about 45 min in a corrosive treatment solution with 30 mass % KOH held at 100° C.

Throughout the treatment time, ultrapure or demineralized water is added to the corrosive treatment solution to offset the evaporation induced by the temperature of the solution higher than 50° C. For this purpose, a reflux assembly is used.

Once the treatment time is reached, the strapped component must be lifted from the solution and abundantly rinsed in ultrapure or distilled water. To dry the optical component, the strapped component is left in vertical position in a clean environment.

III. Advantages of the Method.

III.1. Material and Methods.

To demonstrate the advantages, the results obtained on 3 samples are given below. The analysed samples were three disks of polished fused silica 50 mm in diameter. The first was surface eroded for a time of between 7 and 10 h, using a chemical solution of hydrofluoric acid HF and nitric acid $HNO_3$. This solution was an aqueous solution having ultrapure water as solvent, and having a $HF/HNO_3$ mass ratio of 1:8. The second was eroded for a time of between 7 and 10 h with a potash KOH solution conforming to the protocol described under item II above. The last was kept intact to be used as control sample.

The surface condition of these samples was characterized in different manners with:
- observations of scatter defects using the DMS system;
- roughness measurements using an optical roughness meter;
- roughness measurements using an atomic force microscope AFM;
- measurements of surface energy and wettability; and
- measurements of laser flux resistance.

III.2. Defects Observed with the DMS System.

The system called DMS, abbreviation for «Defects Mapping System», entails illuminating a sample via the edges using a LED light ring and taking a picture of the surface of the sample. Any defects on the surface scatter LED light and appear white in the photo.

DMS photos grouped together in FIG. 1 were taken on chemically treated samples before (FIG. 1A and FIG. 1C) and after treatment (FIGS. 1B and 1D) to observe the effect thereof on the number of surface defects.

The points in the centre and at the top of the samples are deliberate indents intended as reference points. They are not to be taken into consideration when assessing changes in surface condition after the chemical treatments.

Figure 1B:
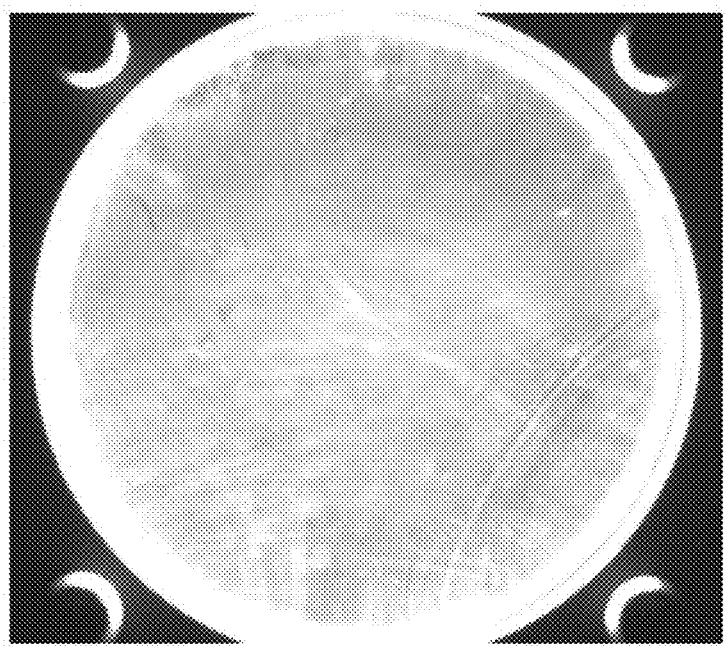
Figure 1C:
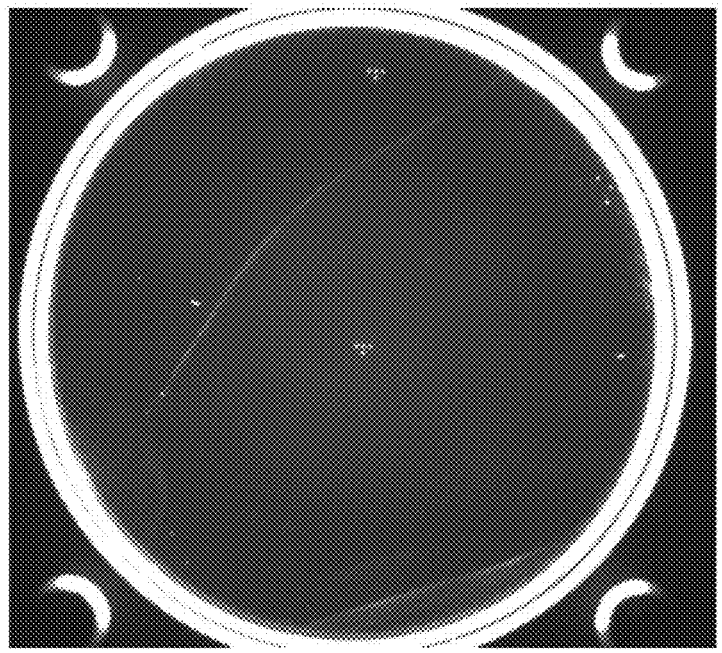
Figure 1D:
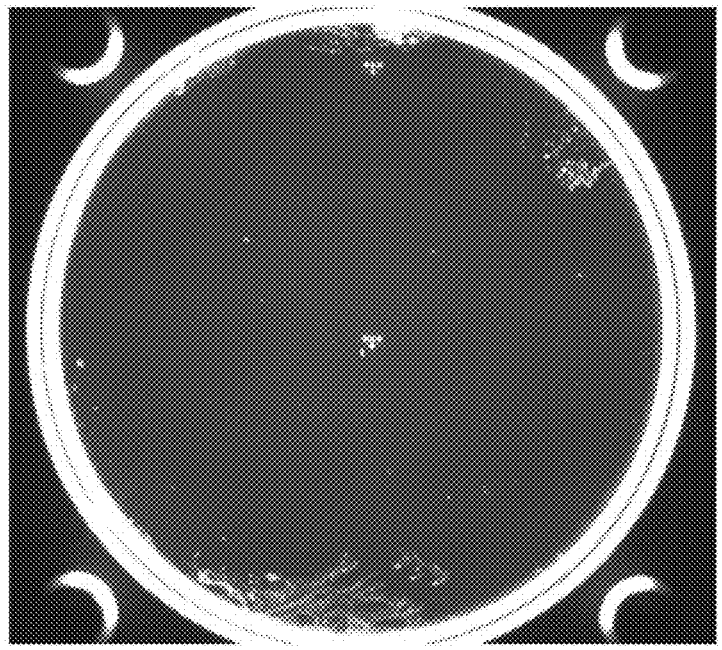

It can be seen that the surface condition of the sample treated with a hydrofluoric acid solution is strongly degraded (FIG. 1B). Treatment with $HF/HNO_3$ led to the onset of a highly scattering white veil made extremely visible with this system of observation. On the contrary, the surface condition of the sample treated with the basic KOH solution was not degraded (FIG. 1D). The traces that can be seen at the bottom and top right of the sample after treatment are traces left by cleaning performed after treatment.

III.3. Roughness.

A. Examined Using an Optical Roughness Meter.

Roughness measurements were taken before and after treatment, using an optical roughness meter.

The device has three different magnification lenses allowing observation of defects having a spatial period ranging from 1 mm to 1 µm. The values given in Table 1 below are RMS roughness values.

TABLE 1

RMS roughness measurements obtained with optical roughness meter on samples before and after treatment

|  | X1 Spatial period between 1 mm and 100 µm | X10 Spatial period between 100 µm and 10 µm | X100 Spatial period between 10 µm and 1 µm |
|---|---|---|---|
| | | Treatment with $HF/HNO_3$ | |
| Before | 0.4 nm | 0.2 nm | 0.4 nm |
| After | 1.3 nm | 1.2 nm | 3.2 nm |
| | | Treatment with KOH | |
| Before | 0.4 nm | 0.2 nm | 0.4 nm |
| After | 0.3 nm | 0.2 nm | 0.2 nm |

Treatment with the acidic solution $HF/HNO_3$ degraded roughness over the three ranges of spatial period. The strongest increase was observed with the ×100 lens, i.e. for small periods. On the contrary, the basic treatment with KOH did not degrade roughness. This treatment even improved roughness when measured with the ×100 lens. The term «chemical smoothing» effect can be given to the treatment subject of the present invention.

B. Examined Using an Atomic Force Microscope (AFM).

Roughness measurements on nanometric scale were taken using an atomic force microscope (AFM) on the two chemically treated samples and on the new control sample. The analysis area measured 5 µm×2.5 µm. The results are given in FIG. 2 where the value indicated in each image is the RMS roughness value in the observed area.

Treatment with KOH (FIG. 2B) doubled surface roughness compared with the non-treated surface (FIG. 2A), whereas acidic treatment with $HF/HNO_3$ (FIG. 2C) multiplied roughness by 20. These characterizations are coherent with the roughness measurements given under item III.3.A above which show a very strong increase in roughness with this type of acid chemical treatment and in particular in defects of small spatial periods (×100 lens).

III.4. Surface Tension and Wettability.

Surface tension was measured for each sample 2 h30 after chemical treatment. Surface tension (surface energy of the glass) after treatment with KOH (64 mN/m) was significantly higher than for the sample treated with acid $HF/HNO_3$ (56 mN/m), indicating the better wettability of the KOH-treated surface.

III.5. Laser Flux Resistance.

UV (355 nm) laser flux resistance tests were performed on these samples. The counted defects relate to damage created by the laser on the exit side of the component.

The test procedure followed was 10:1; i.e. to be declared «non-damaged» each test site must undergo 10 laser pulses at constant energy density per surface unit (fluence) without the onset of a defect.

Figure 3:
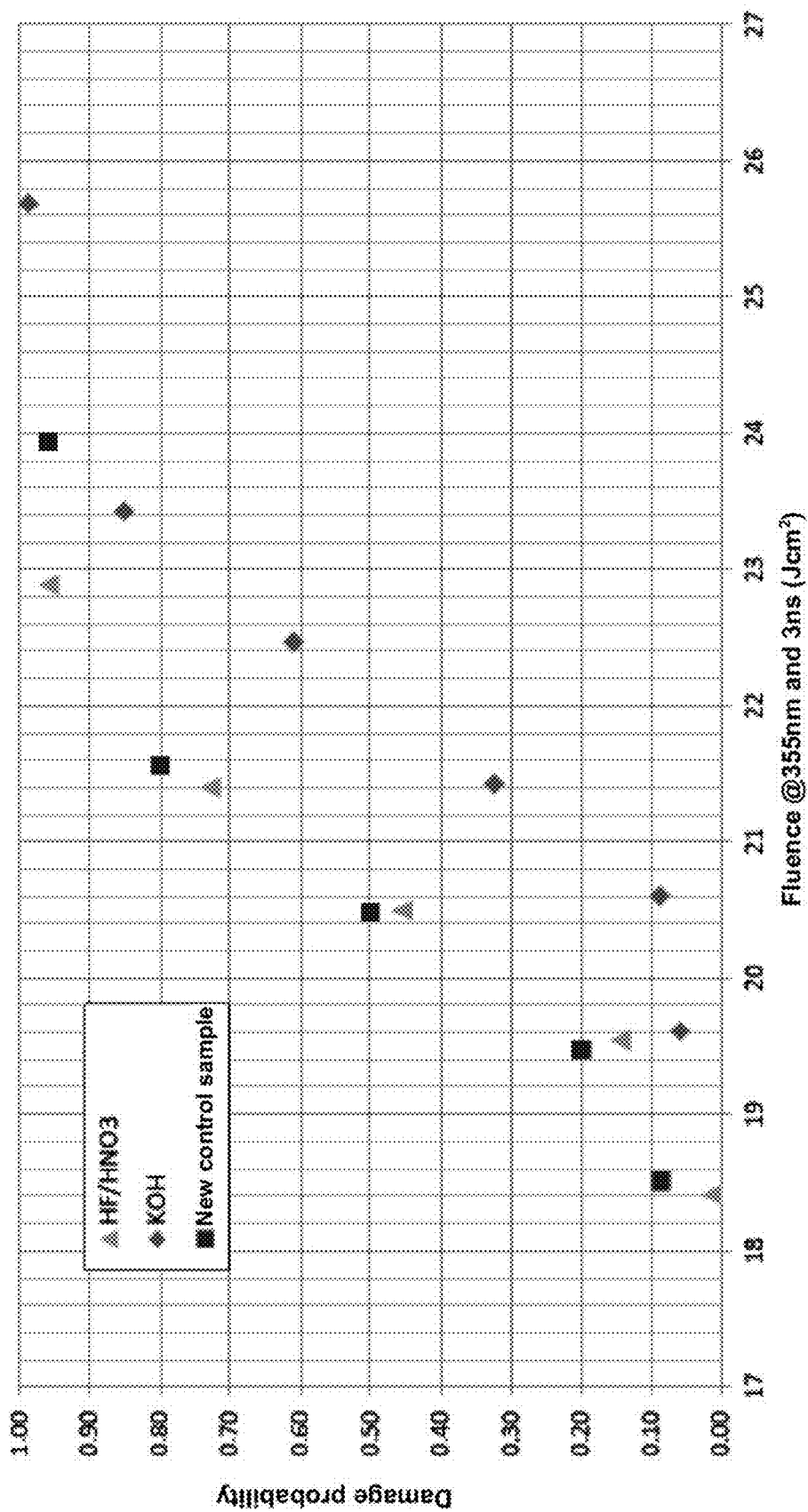
FIG. 3 illustrates the probability of sample damage before («New control sample») and after chemical treatment either with an acidic solution of $HF/HNO_3$ («$HF/HNO_3$»), or with a basic KOH solution («KOH»).

The damage curves are given in FIG. 3.

It can be seen that the sample treated with the $HF/HNO_3$ solution did not improve in performance regarding laser flux resistance. On the contrary, the sample treated with the KOH basic solution reduced its damage probability compared with the new control sample (curve shift towards strong fluence). Treatment with KOH therefore distinctly improved performance in terms of laser flux resistance.

BIBLIOGRAPHIC REFERENCES

[1] International application WO 2013/071021 by Corning Incorporated, published on 16 May 2013.
[2] International application WO 98/07053 by Corning Incorporated, published on 19 Feb. 1998.
[3] Patent U.S. Pat. No. 6,099,389 by United States Department of Energy, published on 8 Aug. 2000.
[4] Patent application JP 2001-342041 by Asahi Glass Co. Ltd, published on 11 Dec. 2001.
[5] Ringlien et al, 1974, «An acid treatment for raising the surface damage threshold of laser glass», Appl. Phys. Lett., vol. 25, page 598.
[6] Battersby et al, 1998, «Effects of Wet Etch Processing on laser-Induced Damage of Fused Silica Surfaces», Proc. SPIE 3578, Laser-Induced Damage in Optical Materials; doi:10.1117/12.344412.
[7] Patent application JP 2002-286902 by Laser Gijtsu Sogo Kenkyusho and Nippon Sheet Glass Co. Ltd, published on 3 Oct. 2002.
[8] Suratwala et al, 2010, «HF-based etching processes for improving laser damage resistance of fused silica optical surfaces», J. Am. Ceram. Soc., DOI: 10.1111/j.1551-2916.2010.04112.
[9] Xu et al, 2015, «The Effect of Deep HF Etching on the Surface Quality and Figure of Fused Silica Optics», Proc. SPIE 9575, Optical Manufacturing and Testing XI, 95750P; doi:10.1117/12.2189079.
[10] Patent application US 2011/079931 by Miller et al, published on 7 Apr. 2011.
[11] Khan et al, 1978, «Etching of Glass Solid State Nuclear Track Detectors in Aqueous Solutions of $(NH_4)HF_2$, NaOH and KOH», International Journal of Applied Radiation and Isotopes, vol. 29, pages 229-232.
[12] Sakai et al, 2013, «Chemical etching using KOH aqueous solution for corona-charge micropatterning of soda-lime glass», Japanese Journal of Applied Physics, vol. 52, pages 036701.1-036701.4.
[13] Kiyama et al, 2009, «Examination of etching agent and etching mechanism on Femtosecond laser microfabrication of channels inside vitreous silica substrates», J. Phys. Chem. C, vol. 113, pages 11560-11566.
[14] International application WO 2015/052556 by UAB «Optida» and State Research Institute Center for Physical Sciences and Technology, published on 16 Apr. 2015.

[15] Jensen et al, 2015, «Higher certainty of the laser induced damage threshold test with a redistributing data treatment», Review of Scientific Instruments, vol. 86, 103106 6.

[16] International application WO 2014/195472 by CEA, published on 11 Dec. 2014.

What is claimed is:

1. Method for improving the properties of laser flux resistance of an optical component made of fused silica, comprising a step consisting of placing said optical component made of fused silica in contact with an aqueous solution comprising at least one hydroxide of an alkaline metal or alkaline-earth metal in an amount of between 5 and 30 mass % and having a temperature T of between 50 and 100° C., the damage probability on the backside in relation to the direction of propagation of the laser beam, for laser having a wavelength of 355 nm, pulse of 3 ns and fluence of between 19 and 22 $J/cm^2$, of the optical component made of fused silica treated with said method being reduced by at least 10% compared with damage probability on the backside in relation to the direction of propagation of the laser beam of a non-treated optical component made of fused silica.

2. The method according to claim 1, wherein said aqueous solution is selected from among an aqueous solution of sodium hydroxide (NaOH), an aqueous solution of potassium hydroxide (KOH), an aqueous solution of calcium hydroxide ($Ca(OH)_2$), an aqueous solution of lithium hydroxide (LiOH), an aqueous solution of caesium hydroxide (CsOH) and mixtures thereof.

3. The method according to claim 1, wherein it comprises the following successive steps:
 a) preparing the aqueous solution comprising at least one hydroxide of an alkaline metal or alkaline-earth metal in an amount of between 5 and 30 mass % and having a temperature T of between 50 and 100° C.;
 b) contacting the optical component made of fused silica with the solution prepared at step (a), said contacting being conducted at said temperature T;
 c) rinsing the optical component made of fused silica with deionized water, distilled water or ultrapure water.

4. The method according to claim 1, wherein, for said contacting, said optical component made of fused silica is vertically immersed and vertically held in said aqueous solution comprising at least one hydroxide of an alkaline metal or alkaline-earth metal.

5. The method according to claim 1, wherein said contacting is performed under agitation.

6. The method according to claim 1, wherein throughout said contacting the volume of said aqueous solution comprising at least one hydroxide of an alkaline metal or alkaline-earth metal is permanently completed with ultrapure or demineralized water to offset the evaporation induced by the temperature of the solution higher than 50° C.

7. The method according to claim 1, wherein throughout said contacting the temperature of said aqueous solution comprising at least one hydroxide of an alkaline metal or alkaline-earth metal is maintained at said temperature T.

8. The method of claim 1, wherein the optical component is transparent following the step of contacting the optical component with the aqueous solution.

9. Method for improving the properties of laser flux resistance of an optical component, consisting of:
 (a) optionally preparing an aqueous solution comprising at least one hydroxide of an alkaline metal or alkaline-earth metal in an amount of between 5 and 30 mass % and having a temperature T of between 50 and 100° C.;
 (b) contacting said optical component with the aqueous solution, said contacting being conducted at said temperature T;
 (c) optionally rinsing the optical component with deionized water, distilled water or ultrapure water;
 the damage probability on the backside in relation to the direction of propagation of the laser beam, for laser having a wavelength of 355 nm, pulse of 3 ns and fluence of between 19 and 22 $J/cm^2$, of the optical component treated with said method being reduced by at least 10% compared with damage probability on the backside in relation to the direction of propagation of the laser beam of a non-treated optical component of same type.

10. The method according to claim 9, wherein said optical component is selected from the group consisting in laser glass, polarizers, mirrors, lenses, diffractive optics such as phase gratings and wave plates, and view ports.

11. The method according to claim 9, wherein the material of said optical component is selected from the group formed by silicate glass, borosilicate glass, aluminosilicate glass, boro-aluminosilicate glass, fused silica and phosphate glass.

* * * * *